United States Patent
Chen

(10) Patent No.: US 10,167,396 B2
(45) Date of Patent: Jan. 1, 2019

(54) LOW SMOKE FIRE-RESISTANT OPTICAL RIBBON

(71) Applicant: Corning Incorporated, Corning, NY (US)

(72) Inventor: Yangbin Chen, Lima, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/585,268

(22) Filed: May 3, 2017

(65) Prior Publication Data

US 2018/0320003 A1 Nov. 8, 2018

(51) Int. Cl.
*C09D 5/18* (2006.01)
*C09D 7/12* (2006.01)
*C09D 4/00* (2006.01)
*G02B 6/44* (2006.01)
(Continued)

(52) U.S. Cl.
CPC .............. *C09D 5/18* (2013.01); *C09D 4/00* (2013.01); *C09D 7/1216* (2013.01); *C09D 7/61* (2018.01); *G02B 6/4403* (2013.01); *G02B 6/4432* (2013.01); *G02B 6/4436* (2013.01); *C08K 2003/2227* (2013.01);
(Continued)

(58) Field of Classification Search
CPC .......... C09D 5/18; C09D 4/00; C09D 7/1216; G02B 6/4408; G02B 6/4432; G02B 6/4436; C08K 2003/2227; C08K 2003/2255; C08K 2201/005; C08K 2201/019
See application file for complete search history.

(56) References Cited

U.S. PATENT DOCUMENTS

| | | | | |
|---|---|---|---|---|
| 3,746,665 A | * | 7/1973 | Koleske et al. ... | C08G 18/4018 521/106 |
| 4,002,580 A | * | 1/1977 | Russo ................ | C08G 18/6775 521/168 |
| 4,076,380 A | | 2/1978 | DiMarcello et al. | |

(Continued)

FOREIGN PATENT DOCUMENTS

| CN | 1773450 A | 5/2006 |
|---|---|---|
| CN | 102585347 A | 7/2012 |

(Continued)

OTHER PUBLICATIONS

International Search Report and Written Opinion PCT/US2018/030381 dated Jul. 17, 2018.

*Primary Examiner* — Peter Radkowski
(74) *Attorney, Agent, or Firm* — Tamika A. Crawl-Bey

(57) ABSTRACT

Embodiments of an optical fiber ribbon cable are provided. The optical fiber ribbon cable includes a cable jacket having an interior surface defining a central bore, at least one buffer tube located in the central bore of the cable jacket, and at least one optical fiber ribbon disposed within the at least one buffer tube. The at least one optical fiber ribbon includes a plurality of optical fibers, a polymer matrix surrounding the plurality of optical fibers, and a low-smoke, flame retardant (LSFR) coating surrounding the polymer matrix. The LSFR coating includes from 25 to 65% by weight of an inorganic, halogen-free flame retardant filler dispersed in a curable acrylate medium. Further, the inorganic, halogen-free flame retardant filler includes particles having, on average, a maximum outer dimension of 5 microns.

7 Claims, 7 Drawing Sheets

(51) Int. Cl.
*C09D 7/61* (2018.01)
*C08K 3/22* (2006.01)

(52) U.S. Cl.
CPC ........... *C08K 2003/2255* (2013.01); *C08K 2201/005* (2013.01); *C08K 2201/019* (2013.01)

(56) References Cited

U.S. PATENT DOCUMENTS

| | | | |
|---|---|---|---|
| 4,176,911 A | 12/1979 | Marcatili et al. | |
| 4,300,930 A | 11/1981 | Chang | |
| 4,322,575 A * | 3/1982 | Skipper | C08K 3/22 174/120 SR |
| 4,402,570 A | 9/1983 | Chang | |
| 4,439,008 A | 3/1984 | Joormann et al. | |
| 4,486,212 A | 12/1984 | Berkey | |
| 4,608,409 A | 8/1986 | Coady et al. | |
| 4,609,718 A | 9/1986 | Bishop et al. | |
| 5,173,960 A * | 12/1992 | Dickinson | G02B 6/4403 174/121 A |
| 5,204,928 A | 4/1993 | Konda et al. | |
| 5,456,984 A | 10/1995 | Bishop et al. | |
| 5,729,645 A | 3/1998 | Garito et al. | |
| 5,837,750 A | 11/1998 | Szum et al. | |
| 5,851,663 A * | 12/1998 | Parsons | C08K 5/0066 428/352 |
| 5,978,536 A * | 11/1999 | Brandi | G02B 6/441 385/102 |
| 6,026,208 A | 2/2000 | Will et al. | |
| 6,045,913 A | 4/2000 | Castle | |
| 6,080,483 A | 6/2000 | Szum et al. | |
| 6,236,791 B1 * | 5/2001 | Lausch | G02B 6/4436 385/109 |
| 6,252,173 B1 | 6/2001 | Brown et al. | |
| 6,254,981 B1 | 7/2001 | Castle | |
| 6,284,368 B2 | 9/2001 | Muta et al. | |
| 6,316,516 B1 | 11/2001 | Chien et al. | |
| 6,433,049 B1 * | 8/2002 | Romenesko | C08L 23/02 524/261 |
| 6,453,104 B1 | 9/2002 | Shimada et al. | |
| 6,472,450 B2 | 10/2002 | Szum et al. | |
| 6,498,883 B1 | 12/2002 | Wilson | |
| 6,556,757 B2 | 4/2003 | Ellison et al. | |
| 6,584,256 B2 | 6/2003 | Shimada et al. | |
| 6,628,866 B1 * | 9/2003 | Wilson | G02B 6/4404 385/114 |
| 6,775,451 B1 | 8/2004 | Botelho et al. | |
| 6,846,852 B2 * | 1/2005 | Allen | C08G 77/20 522/109 |
| 6,893,719 B1 | 5/2005 | Nakajima et al. | |
| 7,144,941 B2 * | 12/2006 | Sauerwein | C01F 7/023 423/629 |
| 7,153,570 B2 | 12/2006 | Nakajima et al. | |
| 7,155,100 B2 | 12/2006 | Murphy et al. | |
| 7,221,841 B2 | 5/2007 | Chase et al. | |
| 7,304,245 B2 * | 12/2007 | Alexander | H01B 3/12 174/110 R |
| 7,326,739 B2 * | 2/2008 | Wilson | G02B 6/4404 522/173 |
| 7,354,958 B2 | 4/2008 | Ohkoshi et al. | |
| 7,378,463 B2 * | 5/2008 | Abu-Isa | C08L 23/06 252/609 |
| 7,403,687 B2 * | 7/2008 | Smith | G02B 6/4432 385/102 |
| 7,459,498 B2 * | 12/2008 | Globus | C08K 3/22 174/110 FC |
| 7,493,000 B2 | 2/2009 | Yamaguchi et al. | |
| 7,542,644 B2 | 6/2009 | Tanaka et al. | |
| 7,542,645 B1 | 6/2009 | Hua et al. | |
| 7,577,330 B2 | 8/2009 | Beshears et al. | |
| 7,660,504 B2 | 2/2010 | Beshears et al. | |
| 7,660,505 B2 | 2/2010 | Chase et al. | |
| 7,689,080 B2 | 3/2010 | Inaba et al. | |
| 8,081,853 B2 | 12/2011 | Overton | |
| 8,409,479 B2 * | 4/2013 | Alexander | C04B 26/02 106/18.11 |
| 8,513,374 B2 * | 8/2013 | Dasgupta | C07C 43/215 525/277 |
| 8,545,076 B2 | 10/2013 | Bickham et al. | |
| 8,551,428 B2 * | 10/2013 | Pohl | C01F 5/24 423/165 |
| 8,591,087 B2 | 11/2013 | Bickham et al. | |
| 8,781,278 B2 * | 7/2014 | Karayianni | C08K 5/0066 385/100 |
| 8,811,783 B2 | 8/2014 | Tanaka et al. | |
| 8,948,558 B2 * | 2/2015 | Chalk | G02B 6/4403 385/114 |
| 8,957,141 B2 * | 2/2015 | Makadia | C08K 5/52 174/110 SR |
| 9,061,920 B2 * | 6/2015 | Pohl | C01F 5/24 |
| 9,244,221 B1 | 1/2016 | Ocampo | |
| 9,378,868 B2 * | 6/2016 | Flenniken | C08K 3/22 |
| 9,529,170 B2 * | 12/2016 | Sutehall | G02B 6/4433 |
| 9,658,418 B2 * | 5/2017 | Ceschiat | G02B 6/4438 |
| 9,745,445 B2 * | 8/2017 | Zucchelli | C08L 83/06 |
| 2003/0059613 A1 * | 3/2003 | Tirelli | C08K 3/0058 428/375 |
| 2003/0064232 A1 * | 4/2003 | Allen | C08G 77/20 428/447 |
| 2003/0072546 A1 | 4/2003 | Shimada et al. | |
| 2003/0118296 A1 * | 6/2003 | Smith | G02B 6/4432 385/102 |
| 2003/0133679 A1 | 7/2003 | Murphy et al. | |
| 2003/0180017 A1 | 9/2003 | Hayano et al. | |
| 2004/0086248 A1 * | 5/2004 | Wilson | G02B 6/4404 385/128 |
| 2004/0147659 A1 * | 7/2004 | Sauerwein | C01F 7/023 524/437 |
| 2004/0216914 A1 * | 11/2004 | Vexler | H01B 3/441 174/121 A |
| 2005/0004278 A1 * | 1/2005 | Knop | C08K 5/02 524/99 |
| 2005/0101708 A1 * | 5/2005 | Knop | C08K 3/0058 524/115 |
| 2005/0187328 A1 * | 8/2005 | Globus | C08K 3/22 524/430 |
| 2005/0221568 A1 | 10/2005 | Ishida et al. | |
| 2005/0269254 A1 | 12/2005 | Roitman | |
| 2006/0088263 A1 | 4/2006 | Tanaka et al. | |
| 2006/0127014 A1 | 6/2006 | Ledbetter et al. | |
| 2007/0014724 A1 | 1/2007 | Witte et al. | |
| 2008/0045623 A1 | 2/2008 | Yamaguchi et al. | |
| 2008/0232750 A1 | 9/2008 | Inaba et al. | |
| 2009/0118410 A1 | 5/2009 | Herbiet et al. | |
| 2009/0281215 A1 * | 11/2009 | Kaul | C07D 251/50 524/97 |
| 2010/0135623 A1 | 6/2010 | Overton | |
| 2011/0094268 A1 | 4/2011 | Xue et al. | |
| 2011/0122646 A1 | 5/2011 | Bickham et al. | |
| 2011/0300367 A1 | 12/2011 | Chien | |
| 2012/0184682 A1 * | 7/2012 | Dasgupta | C07C 43/215 525/277 |
| 2012/0224818 A1 * | 9/2012 | Karayianni | C08K 5/0066 385/100 |
| 2012/0267584 A1 * | 10/2012 | Pohl | C01F 5/24 252/601 |
| 2012/0288246 A1 * | 11/2012 | Chalk | G02B 6/4403 385/114 |
| 2013/0248783 A1 | 9/2013 | Zhu et al. | |
| 2013/0330468 A1 * | 12/2013 | Makadia | C08K 5/52 427/117 |
| 2014/0004347 A1 * | 1/2014 | Pohl | C01F 5/24 428/402 |
| 2014/0063838 A1 | 3/2014 | Kouzmina et al. | |
| 2014/0241677 A1 * | 8/2014 | Sutehall | G02B 6/4433 385/104 |
| 2014/0348776 A1 * | 11/2014 | Palmer, Jr. | C09D 7/001 424/78.09 |
| 2015/0064465 A1 * | 3/2015 | Flenniken | C08L 23/12 428/380 |
| 2015/0131952 A1 | 5/2015 | Gallo et al. | |

(56) References Cited

U.S. PATENT DOCUMENTS

| | | | | |
|---|---|---|---|---|
| 2015/0147571 A1* | 5/2015 | Alexander | ............... | C08L 23/04 428/391 |
| 2015/0203693 A1* | 7/2015 | Mestan | ................... | C08L 23/16 428/195.1 |
| 2015/0226928 A1* | 8/2015 | Ceschiat | ............... | G02B 6/4438 385/112 |
| 2015/0376368 A1* | 12/2015 | Zucchelli | ................ | C08L 83/06 524/269 |
| 2016/0075849 A1* | 3/2016 | Kaul | ...................... | C08K 5/521 524/430 |
| 2017/0002179 A1* | 1/2017 | Henze | ................ | C08G 18/4854 |
| 2017/0002199 A1* | 1/2017 | Henze | ................. | C08G 18/664 |
| 2017/0327665 A1* | 11/2017 | Kaul | .................. | C08K 5/34926 |

FOREIGN PATENT DOCUMENTS

| | | | |
|---|---|---|---|
| CN | 202996398 U | 6/2013 | |
| CN | 203165550 U | 8/2013 | |
| CN | 103413606 A | 11/2013 | |
| CN | 103435897 A | 12/2013 | |
| EP | 0646552 B1 | 12/1997 | |
| EP | 1870746 A1 | 12/2007 | |
| JP | 7084130 A | 3/1995 | |
| JP | 11052184 A | 2/1999 | |
| JP | 03174537 B2 | 6/2001 | |
| JP | 2001278641 A | 10/2001 | |
| JP | 2001305399 A | 10/2001 | |
| JP | 2002029784 A | 1/2002 | |
| JP | 2003227942 A | 8/2003 | |
| JP | 2004018300 A | 1/2004 | |
| JP | 2005008448 A | 1/2005 | |
| JP | 2005173084 A | 6/2005 | |
| JP | 03717475 B2 | 11/2005 | |
| JP | 2005326567 A | 11/2005 | |
| JP | 03746018 B2 | 2/2006 | |
| JP | 03955829 B2 | 8/2007 | |
| JP | 04195307 B2 | 12/2008 | |
| JP | 04495016 B2 | 6/2010 | |
| JP | 04532314 B2 | 8/2010 | |
| JP | 04776392 B2 | 9/2011 | |
| JP | 04956148 B2 | 6/2012 | |
| JP | 2013238695 A | 11/2013 | |
| JP | 2014058649 A | 4/2014 | |
| WO | WO 2015028047 A1 * | 3/2015 | ........... C09D 7/1225 |

* cited by examiner

LOW SMOKE FIRE-RESISTANT OPTICAL RIBBON

BACKGROUND

The disclosure relates generally to a flame retardant coating and more particularly to a flame retardant coating in which a flame retardant filler is dispersed in a curable medium. Flame retardant materials are used to protect combustible materials, such as plastics or wood, from fire damage and heat. Additionally, flame retardant materials have been used to protect materials that lose their strength when exposed to high temperatures, such as steel.

SUMMARY

In one aspect, embodiments of an optical fiber ribbon cable are provided. The optical fiber ribbon cable includes a cable jacket having an interior surface defining a central bore, at least one buffer tube located in the central bore of the cable jacket, and at least one optical fiber ribbon disposed within the at least one buffer tube. The at least one optical fiber ribbon includes a plurality of optical fibers, a polymer matrix surrounding the plurality of optical fibers, and a low-smoke, flame retardant (LSFR) coating surrounding the polymer matrix. The LSFR coating includes from 25 to 65% by weight of an inorganic, halogen-free flame retardant filler dispersed in a curable acrylate medium. Further, the inorganic, halogen-free flame retardant filler has a maximum outer dimension of 5 microns.

In another aspect, embodiments of a low-smoke, flame retardant (LSFR) coating are provided. The LSFR coating includes an inorganic, halogen-free flame retardant filler and a curable acrylate medium. The inorganic, halogen-free flame retardant filler has a maximum outer dimension of 5 microns, and the inorganic, halogen-free flame retardant filler is dispersed in the curable medium.

In still another aspect, embodiments of a method of improving the flame retardance of an optical fiber cable are provided. The method includes a first step of dispersing an inorganic, halogen-free flame retardant filler having a maximum outer dimension of 5 microns in a curable acrylate medium to create an LSFR coating. The method includes a second step of applying the LSFR coating to at least one component of an optical fiber cable.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of a low-smoke, flame retardant (LSFR) coating that is especially applicable to optical fiber ribbons are provided. More specifically, embodiments of the LSFR coating have an inorganic, halogen-free flame retardant filler dispersed in a curable coating. Advantageously, the LSFR coating is able to provide enhanced flame retardance while avoiding any substantial reduction in mechanical properties. In particular, embodiments of the LSFR coating provide a higher limiting oxygen index, a lower peak heat release rate, reduced smoke production, and satisfactory mechanical properties as compared to standard coatings used in optical fiber ribbons. In this regard, Applicant has found that an LSFR coating in which the flame retardant filler is dispersed in a curable medium provides enhanced flame retardance (as compared to standard coating materials) and satisfactory mechanical performance for cable applications (as compared to standard flame retardant coatings in which the flame retardant material tends to aggregate or leach from the carrier medium). In embodiments, the LSFR coating can be used on optical fiber cable components, including, e.g., as a coating on optical fiber ribbons, on optical fibers, and on buffer tubes.

Figure 1:
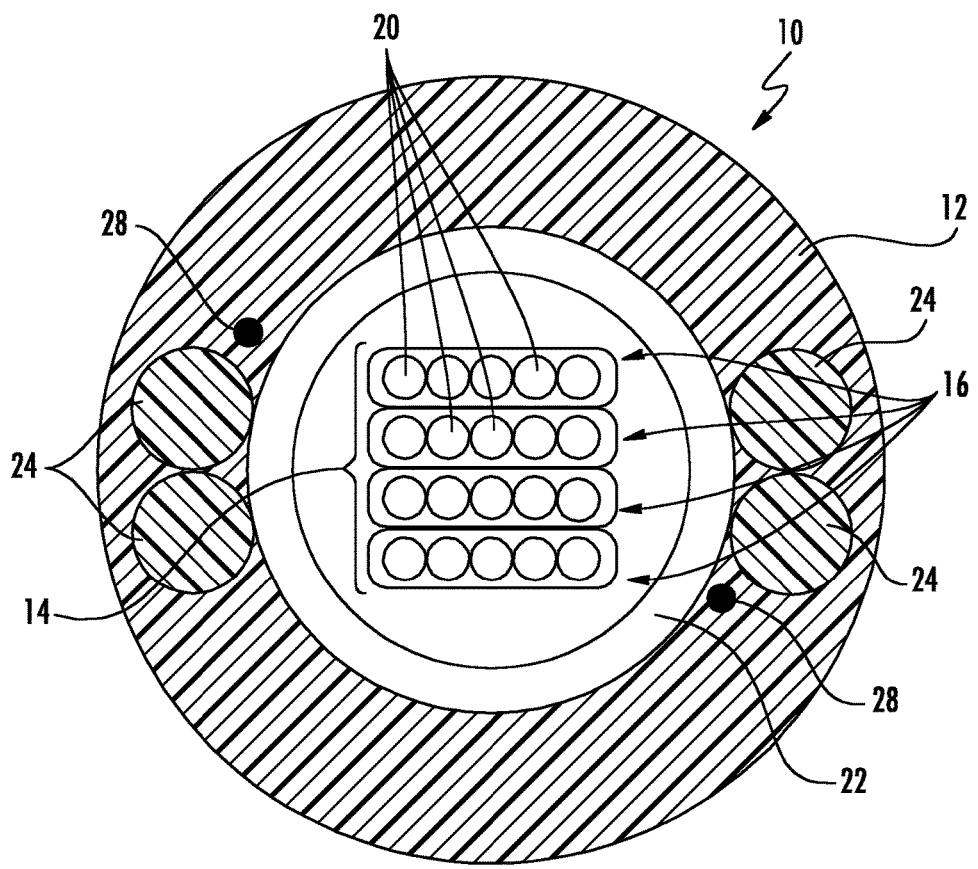
FIG. 1 depicts an optical fiber ribbon cable including a low-smoke, flame retardant coating (LSFR), according to an exemplary embodiment.

Referring to FIG. 1, an optical cable, shown as cable 10, is illustrated according to an exemplary embodiment. Cable 10 includes an outer cable jacket, shown as outer jacket 12. As will be generally understood, the interior of the jacket 12 defines an internal region, or bore, within which the various cable components discussed herein are located.

In various embodiments, cable jacket 12 is formed from an extruded thermoplastic material. In various embodiments, cable jacket 12 may be a variety of materials used in cable manufacturing such as polyethylene, medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

Contained within cable 10 is a stack 14 of optical fiber ribbons 16. Each ribbon 16 includes one or more optical transmission elements or optical waveguides, shown as optical fibers 20. As shown in FIG. 1, cable 10 includes a single buffer tube 22 surrounding the stack 14 of optical fiber ribbons 16. In various embodiments, cable 10 includes at least four ribbons 16 within stack 14, and each ribbon 16 supports at least five optical fibers 20. However, in other embodiments, a different number of ribbons 16, including more or less than shown in FIG. 1, may be provided within each buffer tube 22. Additionally, in other embodiments, a different number of optical fibers 20, including more or less than shown in FIG. 1, may be provided within each ribbon 16.

In the embodiment shown, multiple strength members 24 are embedded in cable jacket 12 to provide structure and protection to the optical fibers 20 during and after installation (e.g., protection during handling, protection from elements, protection from the environment, protection from vermin, etc.). In various embodiments, cable 10 includes four strength members 24 that are arranged in diametrically opposed pairs. Each strength member 24 may be any suitable axial strength member, such as a glass-reinforced plastic rod, steel rod/wire, etc. Cable 10 may include a variety of other components or layers, such as a metal armor layer, helically wrapped binders, circumferential constrictive thin-film binders, water blocking tape materials, water-blocking fiber materials, etc. Additionally, in the embodiment shown, cable 10 includes one or more preferential tear feature and/or ripcord 28 embedded in or underneath jacket 12. In this embodiment, preferential tear feature and/or ripcord 28 is located with jacket 12 such that ripcord 28 facilitates opening of outer jacket 12.

Figure 2:
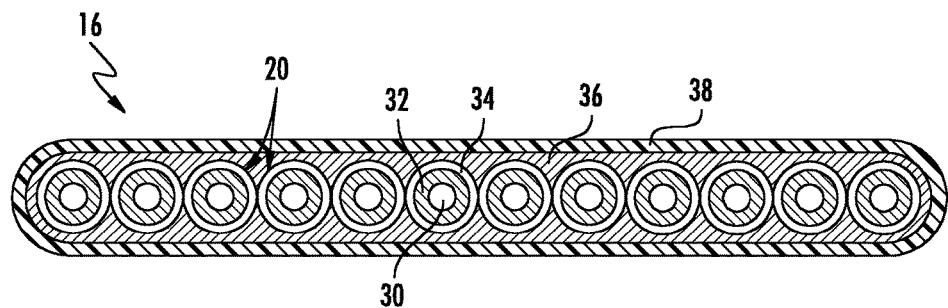
FIG. 2 depicts an optical fiber ribbon including an LSFR coating, according to an exemplary embodiment.

FIG. 2 depicts the construction of an exemplary embodiment of an optical fiber ribbon 16. As can be seen, the optical fiber ribbon 16 includes a plurality of optical fibers 20. In the embodiment depicted, there are twelve optical fibers 20. Each optical fiber 20 includes a glass core and cladding region 30 along which optical signals propagate such that the core is surrounded by the cladding so as to substantially keep the optical signals within the core. The core and cladding region 30 is surrounded by a primary coating 32 and a secondary coating 34. The dual layer coating, i.e., primary coating 32 and secondary coating 34, provide enhanced protection for the core and cladding region 30 against microbending-induced attenuation. In embodiments, each optical fiber 20 in the optical fiber ribbon 16 has a different color ink layer applied to the secondary coating 34 such that the optical fibers 20 can be discerned from each other during installation, splicing, repair, etc.

A polymeric matrix 36 holds the optical fibers 20 together in parallel within the optical fiber ribbon 16. Surrounding the polymeric matrix 36 is an LSFR coating 38. In embodiments, ribbon identification information is printed on to polymeric matrix 36, and the LSFR coating 38 provides the additional function of preserving the printing from smudging, rubbing off, abrasion, etc. In embodiments, the polymeric matrix 36 and the LSFR coating 38 have the same composition, including the composition described in greater detail below. In other embodiments, the polymeric matrix 36 is selected to have a higher Young's modulus, while also being compatible with LSFR coating 38. In a particular embodiment, the polymeric matrix is composed of 40% by weight bisphenol A epoxy diacrylate, 53% by weight ethoxylated (10) bisphenol diacrylate, 5% by weight N-vinylcaprolactam, and the balance of photoinitiators/catalysts, antioxidents, slip aids, etc.

In various embodiments, the LSFR coating 38 is a layer of polymer material surrounding the polymeric matrix 36. In specific embodiments, the LSFR coating 38 is a contiguous and continuous layer of polymer material completely surrounding the polymeric matrix 36 in the axial cross-sectional view shown in FIG. 2. In this arrangement, the LSFR coating 38 defines an inner surface contacting (specifically bonded, such as through melt bonding or crosslinking) the outer surface of polymeric matrix 36. An outer surface of LSFR coating 38 defines the outermost surface of ribbon 16, and the LSFR coating 38 is the outermost polymer layer of ribbon 16.

The LSFR coating 38 is configured to provide a measure of flame retardance to the optical fiber ribbon 16. Generally, the LSFR coating 38 includes particles of one or more flame retardant fillers dispersed in a curable medium. In embodiments, the flame retardant fillers are inorganic, halogen-free materials. As used herein, "halogen-free" means that the materials have a total halogen content of less than 1500 ppm in compliance with IEC 61249-2-21. For example, suitable flame retardant materials include aluminum trihydrate (ATH), huntite/hydromagnesite (HMH, e.g., UltraCarb®, available from LKAB Minerals, Luleå, Sweden), magnesium hydroxide (MDH), zinc borate (e.g., Firebrake®, available from Rio Tinto Borates, Greenwood Village, Colo.), halloysite (aluminosilicate) nanoclay, organically modified phyllosilicates (e.g., CLOISITE®, available from BYK Additives, Inc., Gonzales, Tex.), and ammonium octamolybdate (AOM). In embodiments, the flame retardant fillers have a particle size in which the particles have, on average, a maximum outer dimension of 5 microns or less. In other embodiments, the flame retardant fillers have a particle size in which the particles have, on average, a maximum outer dimension of 1 micron or less. Further, in some embodiments, the flame retardant fillers have a particle size in which the particles have, on average, a minimum outer dimension of 0.1 micron or more, and in still other embodiments, the flame retardant fillers have a particle size in which the particles have, on average, a minimum outer dimension of 0.25 micron or more.

The flame retardant fillers are dispersed in a curable medium. In embodiments, the medium is curable using ultraviolet (UV) radiation. Also, in embodiments, the curable medium is composed of one or more monomers, oligomers, catalysts, and/or other additives. In specific embodiments, the monomers and oligomers are acrylates. Further, in embodiments, the monomers can have mono-, di-, tri-, or higher functionality. For example, suitable monomers include alkoxylated aliphatic polyacrylates, for instance an alkoxylated aliphatic diacrylate such as alkoxylated (e.g., propoxylated) neopentyl glycol diacrylate; tripropyleneglycol diacrylate; ethoxylated bisphenol A diacrylates; bisphenol A epoxy diacrylate; dipentaerythritol monohydroxy pentaacrylate; methylolpropane polyacrylates with and without alkoxylation such as trimethylolpropane triacrylate, ditrimethylolpropane tetraacrylate; alkoxylated glyceryl triacrylates such as propoxylated glyceryl triacrylate with propoxylation being 3 or greater; dipropylene glycol diacrylate; erythritol polyacrylates with and without alkoxylation, such as pentaerythritol tetraacrylate, ethoxylated pentaerythritol tetraacrylate, dipentaerythritol pentaacrylate; and combinations thereof. In embodiments, the oligomers include, for example, aliphatic urethane acrylates, epoxy acrylates, epoxy methacrylates, polyester acrylates, silicone acrylates, urethane methacrylates, and combinations thereof.

In embodiments, the catalyst is a photoinitiator. For example, suitable photoinitiators include 1-hydroxy-cyclohexyl-phenyl-ketone (e.g., IRGACURE® 184 available from BASF of Florham Park, N.J.); bis(2,6-dimethoxybenzoyl)-2,4,4-trimethylpentylphosphine oxide (e.g., IRGACURE® 1800, IRGACURE® 1850, and IRGACURE® 1700 commercially available from BASF of Florham Park, N.J.); 2,2-dimethoxy-2-phenylacetophenone (e.g., IRGACURE® 651 commercially available from BASF of Florham Park, N.J.); bis(2,4,6-trimethylbenzoyl)-phenylphosphine oxide (IRGACURE® 819 commercially available from BASF of Florham Park, N.J.); (2,4,6-trimethylbenzoyl) diphenyl phosphine oxide (LUCIRIN® TPO commercially available from BASF of Florham Park, N.J.); ethoxy(2,4,6-trimethylbenzoyl)-phenylphosphine oxide (LUCIRIN® TPO-L commercially available from BASF of Florham Park, N.J.); and combinations thereof.

In certain embodiments, the curable medium can include additives, such as antioxidants, reactive diluents, slip aids, pigments, fillers, flatting agents, wetting agents, etc. For example, some additives include N-vinylcaprolactam reactive diluent, thiodiethylene bis[3-(3,5-di-tert-butyl-4-hydroxyphenyl)propionate] antioxidant (e.g., IRGANOX® 1035 available from BASF, Ludwighafen, Germany), siconepolyether acrylate slip aid (e.g., TEGO® Rad 2250 available from Evonik Industries AG, Essen, Germany), etc.

In embodiments, the curable medium is composed of from 60 to 95% by weight of the monomer component, 5 to 25% by weight of the oligomer component, 0.5 to 5% by weight of the catalyst component, and 0 to 10% by weight of various additives. In embodiments, the flame retardant material is dispersed in the monomer component of the curable medium. In such embodiments, the flame retardant material comprises from 30 to 75% by weight of the monomer component. In another embodiment, the flame retardant material comprises from 40 to 70% by weight of the monomer component, and in still another embodiment, the flame retardant material comprises from 55 to 65% by weight of the monomer component.

As shown in Table 1, below, three compositions (A2-A4) made according to embodiments of the presently disclosed flame retardant coating were created and compared to a standard, non-flame retardant coating (A1). In compositions A2 and A3, the flame retardant material was ATH having an average maximum outer dimension of 0.25 micron. The ATH was dispersed in (PO)NPGDA, and the ATH constituted 65% by weight of the monomer component of the composition. In composition A4, the flame retardant material was a combination of ATH and AOM. In particular, as shown in Table 1, A4 included 68% of the ATH/(PO) NPGDA dispersion and 8% of the AOM/(PO)NPGDA dispersion. In both dispersions, the flame retardant material comprised 65% by weight of the dispersion. The ATH had an average maximum outer dimension of 0.25 micron and the AOM had an average maximum outer dimension of 1 micron.

TABLE 1

Formulation of optical ribbon coatings

| Ingredient | Component | A1 | A2 | A3 | A4 |
|---|---|---|---|---|---|
| | | % by weight | | | |
| 65% ATH in (PO)NPGDA | Monomer | — | 76 | 76 | 68 |
| 65% AOM in (PO)NPGDA | Monomer | — | — | — | 8 |
| Bisphenol A epoxy diacrylate | Monomer | 30 | 10 | — | — |
| Ethoxylated (4) bisphenol A diacrylate | Monomer | 30 | — | 6 | 6 |
| Ethoxylated (30) bisphenol A diacrylate | Monomer | 32 | 12 | — | — |
| Aliphatic urethane diacrylate | Oligomer | — | — | 16 | 16 |
| N-vinylcaprolactam | Monomer | 5 | — | — | — |
| TPO | Photoinitiator | 1.5 | 1 | 1 | 1 |
| IRGACURE ® 184 | Photoinitiator | 1.5 | 1 | 1 | 1 |
| | Parts per hundred polymer (pph) | | | | |
| IRGANOX ® 1035 | Antioxidant | 0.5 | 0.4 | 0.4 | 0.4 |
| TEGO ® Rad 2250 | Slip Aid | 2 | 2 | 2 | 2 |

Each of the compositions, A1-A4, was characterized using a variety of flammability and mechanical/physical tests. Characterization of flammability was done using the limiting oxygen index (LOI) test and cone calorimeter tests. LOI investigates how much oxygen a material needs for combustion. Materials that have a higher LOI require more oxygen to combust and are, therefore, less susceptible to burning. LOI was measured for each of the compositions A1-A4 according to ASTM D-2863. The results are provided in Table 2, below. As can be seen, the standard coating (A1) has a relatively low LOI of 18%. However, the improved flame retardant coatings (A2-A4) made according to embodiments of the present disclosure have much higher LOI of 26-28%.

TABLE 2

LOI of optical ribbon coatings

| Coatings | A1 | A2 | A3 | A4 |
|---|---|---|---|---|
| LOI | 18% | 28% | 27% | 26% |

The cone calorimeter test, in accordance with ISO 5660, was used to determine the peak heat release rate (PHRR) and amount of smoke release. PHRR determines whether a material burns quickly and intensely or smolders more slowly. Materials that burn quickly and intensely release a relatively large amount of heat in a short period of time, which can cause other materials around them to catch fire. Thus, a relatively low PHRR is a beneficial characteristic of a flame retardant material.

Figure 3:
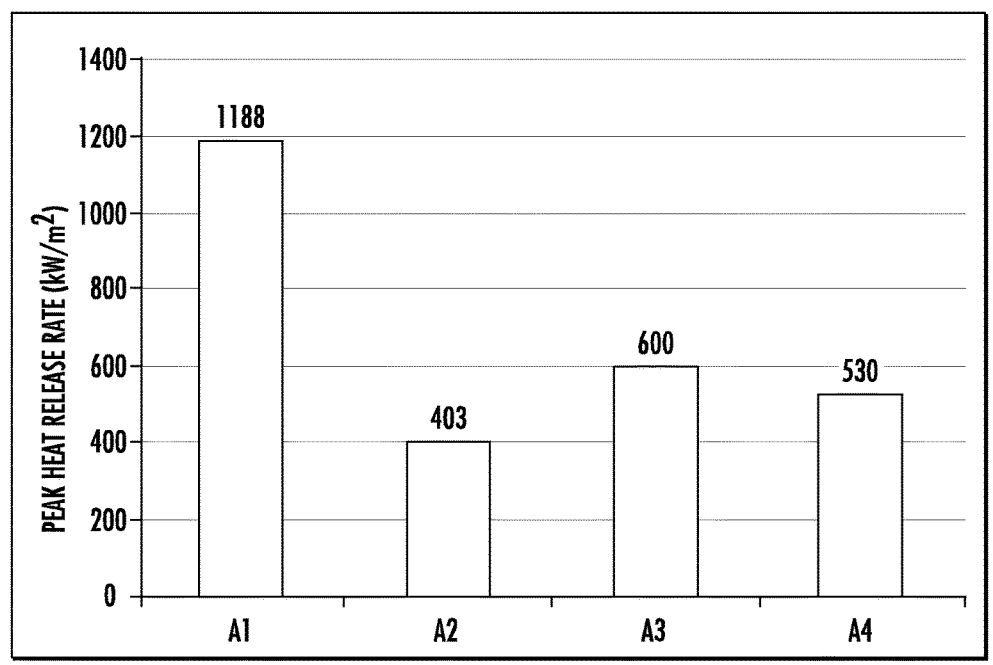
FIG. 3 is a graph depicting the peak heat release rate for LSFR coatings made according to exemplary embodiments as compared to a standard ribbon coating.

Cone calorimeter samples of coatings A1-A4 were prepared by filling a square mold with each coating composition and then curing the samples UV irradiation. Cured coating sheets were then removed from the mold and tested. The samples were square specimens having dimensions of 100 mm×100 mm×3.0 mm. The samples were allowed to condition to equilibrium at 23° C. and 50% relative humidity. The samples were placed on an aluminum tray which was placed on a refractory fiber blanket on top of a ceramic board, and the surface of the specimens were horizontally exposed to irradiation from a cone heater at a heat flux of 50 kW/m$^2$. FIG. 3 provides a graph of the PHRR for the compositions A1-A4 as measured in accordance with the described method. As can be seen in FIG. 3, A1 has a PHRR of 1188 kW/m$^2$, while A2, A3, and A4 all have PHRR of 600 kW/m$^2$ or less. Thus, compared to A1, a significant reduction of PHRR (ranging from 49% (A3) to 66% (A2)) was provided by the LSFR coatings made according to embodiments of the present disclosure.

Figure 4:
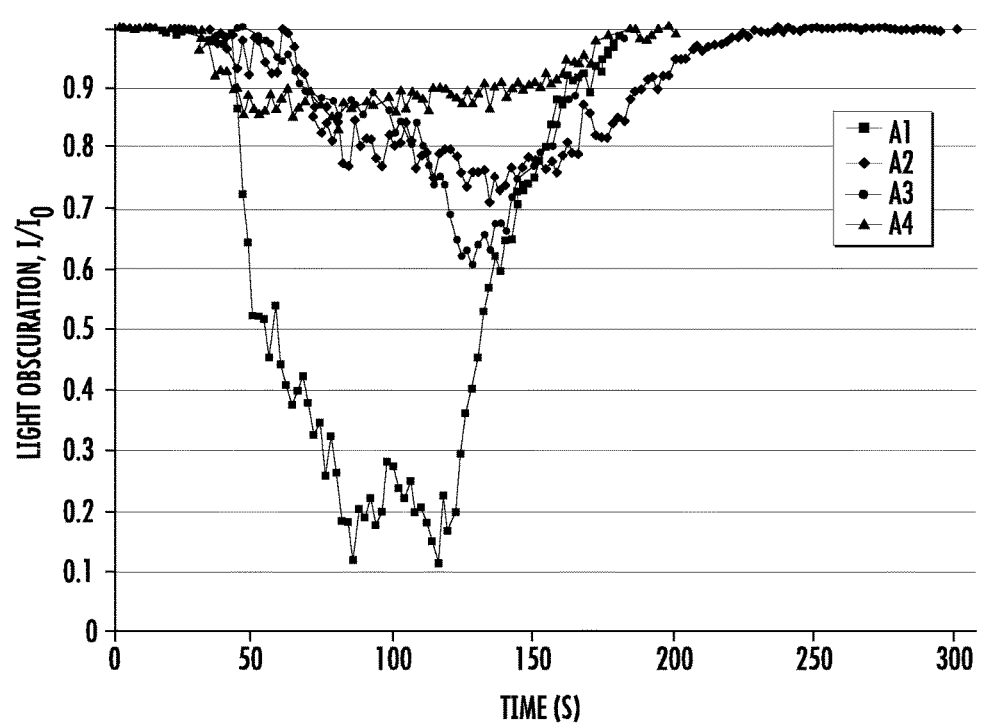
FIG. 4 is a graph depicting the light obscuration for LSFR coatings made according to exemplary embodiments as compared to a standard ribbon coating.

The cone calorimeter test was also used to determine the level of smoke release for the coating compositions. In one aspect, smoke release was determined based on the amount of light that the smoke from the burning sample obscured. That is, a light was placed on one side of the sample during the cone calorimeter test, and the light was shined across the sample while it was burning. The amount of light transmitted across the material (conversely, the amount of light obscured by the smoke) was indicative of the amount of smoke released. Put differently, the ratio $I/I_0$ transmitted light intensity during the test (I) over initial incident light intensity ($I_0$) is a direct indication of smoke release during the cone calorimeter tests. The ratio of $I/I_0$ for each material over the course of the cone calorimeter test is provided in FIG. 4. As can be seen, the standard coating A1 experienced a comparatively large reduction in light transmission as compared to the LSFR coatings A2, A3, and A4. Thus, LSFR coatings A2, A3, and A4 made according to embodiments of the present disclosure release less smoke than the standard coating A1.

Figure 5:
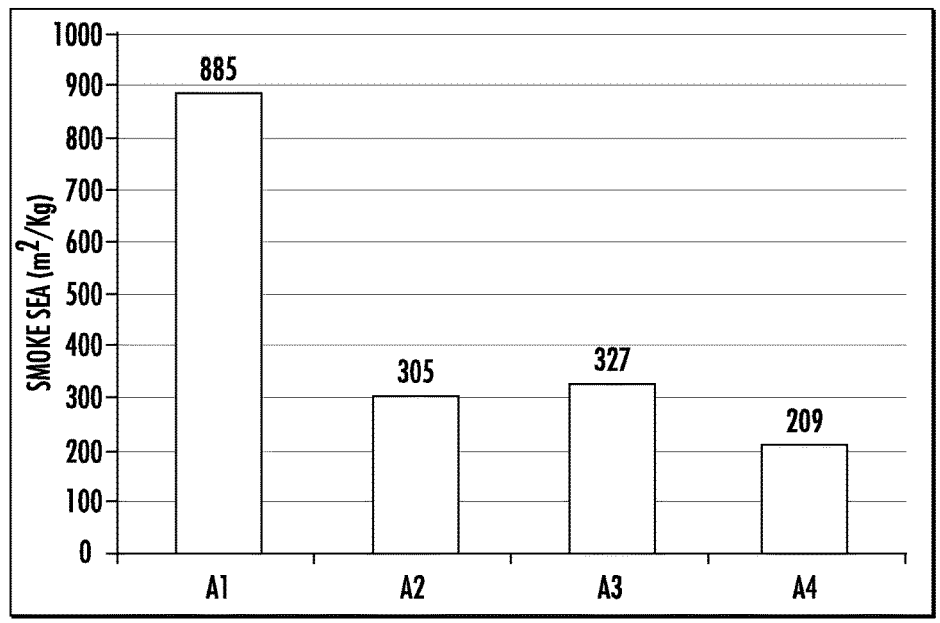
FIG. 5 is a graph depicting the smoke specific extinction area for LSFR coatings made according to exemplary embodiments as compared to a standard ribbon coating.
Figure 6:
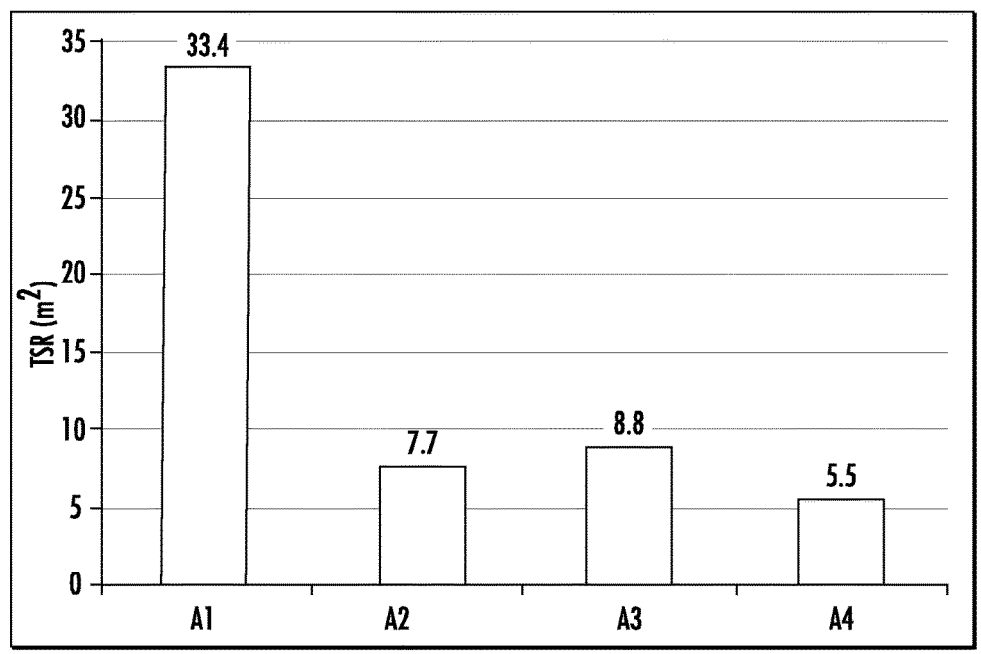
FIG. 6 is a graph depicting the total smoke release for LSFR coatings made according to exemplary embodiments as compared to a standard ribbon coating.

The ratio $I/I_0$ is also used to calculate the average specific extinction area (SEA), which is used to quantify the smoke suppressant performance. Using SEA, the smoke density is expressed in units of $m^2/kg$ (square meters per kilogram), which is a measure of the instantaneous amount of smoke being produced per unit mass of specimen burnt. The SEA for each composition A1-A4 is shown in FIG. 5. As can be seen in FIG. 5, A1 has an SEA of 885 $m^2/kg$, while A2-A4 each have an SEA of 327 $m^2/kg$ or less. Additionally, total smoke release (TSR) was calculated and is shown in FIG. 6. As can be seen in FIG. 6, A1 produced almost four times as much smoke as any of the LSFR coatings A2-A4.

Thus, Table 2 and FIGS. 3-6 demonstrate the improved flammability characteristics of the coating compositions A2, A3, and A4 over the standard coating A1. However, in general, the addition of flame retardant additives to a polymer composition can in some instances affect the mechanical properties of the composition. Accordingly, the mechanical and physical properties of the LSFR coatings A2, A3, and A4 were investigated and compared to the standard coating A1. In this regard, the LSFR coatings A2, A3, and A4 were investigated in order to determine whether the necessary tensile and rheological properties for production, installation, and use were maintained.

Table 3, below, summarizes the tensile and rheological properties of the compositions A1-A4. In particular, the coatings A1-A4 were used to make rod samples for tensile testing. The rods made from coatings A1-A4 were prepared by injecting the coating compositions into Teflon® tubing having an inner diameter of about 0.025 in. The coating filled Teflon® tubing was exposed to UV irradiation from a Fusion D bulb at a dose of about 2.4 $J/cm^2$ (measured over a wavelength range of 225-424 nm by a Light Bug model IL390 from International Light). The Teflon® tubing was then stripped away. The formed rods were allowed to condition overnight at 23° C. and 50% relative humidity for between 18-24 hours before tensile testing. Tensile properties, including Young's modulus and elongation at break, were measured using a Sintech MTS tensile tester, and tests were performed according to ASTM 882-97. The gauge length used for testing was 5.1 cm and the test speed was 2.5 cm/minute. In comparison to the standard coating A1, the LSFR coatings A2-A4 made according to the present disclosure show minimal change in Young's modulus and in viscosity at 25° C. Viscosity of the coatings was measured by Brookfield CAP2000 viscometer, with a #4 spindle at 200 rpm at 25° C.

TABLE 3

Tensile and rheological properties of optical ribbon coatings

| | Young's Modulus (MPa) | Elongation (%) | Viscosity (25° C., P) |
|---|---|---|---|
| A1 | 568 | 43 | 25 |
| A2 | 553 | 13 | 25 |
| A3 | 504 | 24 | 30 |
| A4 | 514 | 18 | 27 |

Additionally, the coatings A3 and A4 were applied to 12-fiber optical fiber ribbons having lengths of 16 kilometers at the production line speed of 450 meter/min. The optical fiber cables with coatings A3 and A4 then underwent a series of standard cable performance tests. As shown in Table 4, below, the LSFR optical ribbons (made with coatings A3 and A4) have comparable performance to standard ribbons made with coating A1, in terms of peel, strip, and robustness ratings. The tests and rating systems are discussed in more detail below.

TABLE 4

Performance summary of optical ribbons

| Ribbon Coating | Standard Board Peel Rating | Strip Tube-off Rating | Robustness |
|---|---|---|---|
| A1 | 1 | 2 | 7.5 |
| A3 | 1 | 2 | 6.6 |
| A4 | 1 | 2 | 6.5 |
| Passing Criteria | Rating ≤3 | Rating ≤3 | >6.0 |

FIG. 6 depicts the peel test used to measure the peel rating shown in Table 4. The peel test setup 100 involves attaching an 18 in cable 110 to a board 120 using carpet adhesive tape 130. A portion of the cable 110 extends past the end of the board 120. The cable 110 is cut using a razor 140 and the ribbon 110 is peeled from the carpet adhesive tape 130 beginning at position 150 until the end of the board is reached. The board 120 is then observed to determine how much of the peeled portion 160 of the ribbon 110 (i.e., polymer matrix 36 and coating 38) remains deposited in the region 170. Table 5, below, describes the rating system for the peel test. The passing rating for the peel test is a 3 or below. The coating 38 and polymer matrix 36 should peel from the ribbon across the entire length and width of the 18 inch ribbon 110. A poor rating would be recorded if the coating cannot be peeled or if the coating peels from the ribbon 110 in fragments along the length of the ribbon 110. As shown in Table 4, the LSFR ribbons with coatings A3 and A4 achieved a peel rating of 1, which is equivalent to the ribbon with the standard coating A1.

TABLE 5

Peel Rating Scale

| Rating | Description |
|---|---|
| 1 | Full length and full width of ribbon peels cleanly past the end of the board |
| 2 | Ribbon peels cleanly to the end of the board, but fragments past the end of the board |

TABLE 5-continued

Peel Rating Scale

| Rating | Description |
|---|---|
| 3 | Ribbon peels the full length, but not the full width |
| 4 | Ribbon fragments along the length |
| 5 | Cannot peel ribbon |

Additionally, the LSFR coatings A1, A3, and A4 were subjected to a tube-off test in which the coating was stripped from the ribbon. Similar to the peel rating, the tube-off test is rated on a five-point scale in which a rating of 1 means that the coating is able to be completely stripped from the ribbon with no distortion of the cable. A rating of 2 is achieved if the coating is able to be completely stripped from the ribbon with only slight ribbon distortion. A rating of 3 is achieved if the coating is able to be stripped from the ribbon with moderate distortion to the ribbon, though the ribbon should remain in one piece. A rating of 4 is given if the coating tube-off is incomplete and if the ribbon is moderately disintegrated. Finally, a rating of 5 is given if there is no tube-off and the ribbon is totally disintegrated. An acceptable ribbon has a tube-off rating of 3 or less. As reported in Table 4, the ribbons with the LSFR coatings A3 and A4 were able to achieve a rating of 2, which was again equivalent to the ribbon having the standard coating A1.

The final ribbon performance test that the ribbons with coatings A1, A3, and A4 were subjected to was the robustness test. During the robustness test, a twelve inch length of ribbon is twisted about its longitudinal axis until the ribbon fails. A "failure" occurs when the polymer matrix 36 of the ribbon delaminates from the optical fibers 20 or when the polymer matrix 36 breaks between two optical fibers 20. A passing rating for a ribbon is at least six complete turns before failing (i.e., the ribbon is twisted 2160° about its longitudinal axis before failing). As disclosed in Table 4, the ribbons with LSFR coatings A3 and A4 were able undergo 6.6 and 6.5 turns, respectively, before failing. Another standard robustness test for optical fiber ribbons is defined in the standard FOTP-141. In this test, a ribbon is subjected to twist cycles in which each cycle consists of rotating the ribbon 180° clockwise, 360° counterclockwise, and then 180° clockwise. A ribbon is given a passing grade if it is able to withstand 20 such cycles. The previously twist-to-failure test is considered harsher than FOTP-141, and therefore, it is envisioned that the optical fiber ribbons with coatings A3 and A4 would also pass the FOTP-141 test.

Figure 7:
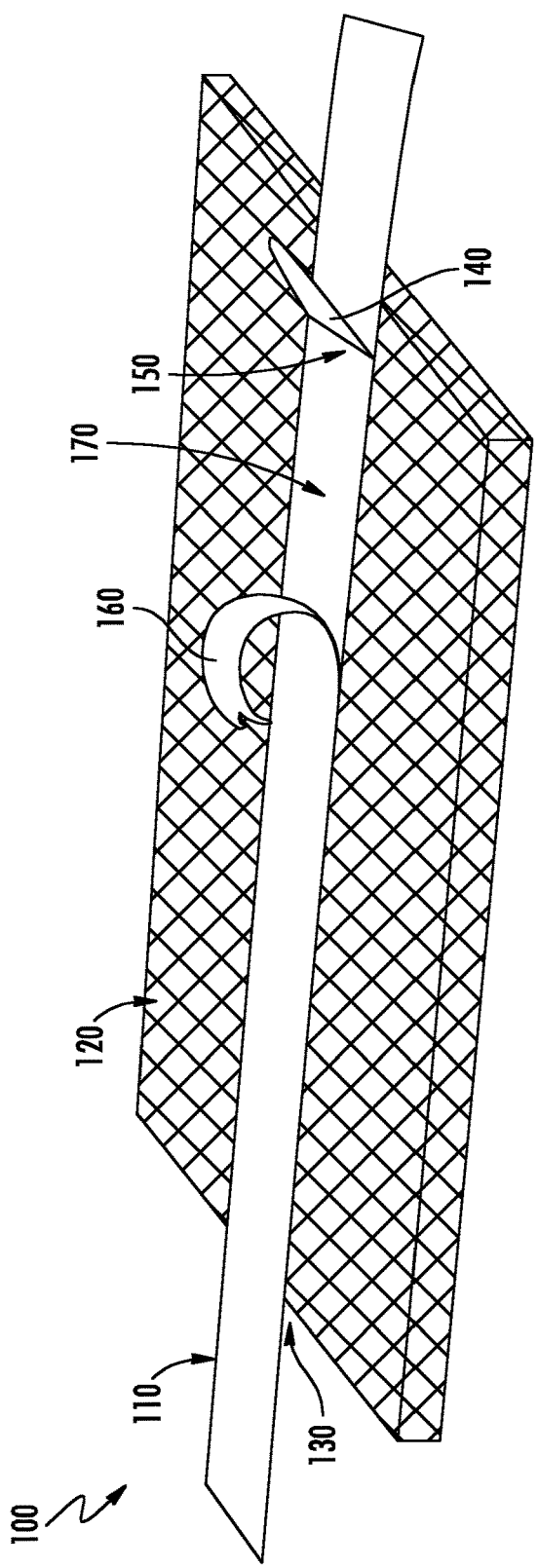
FIG. 7 depicts a peel-off test set-up used to determine the peel-off rating of LSFR coatings made according to exemplary embodiments.
Figure 8:
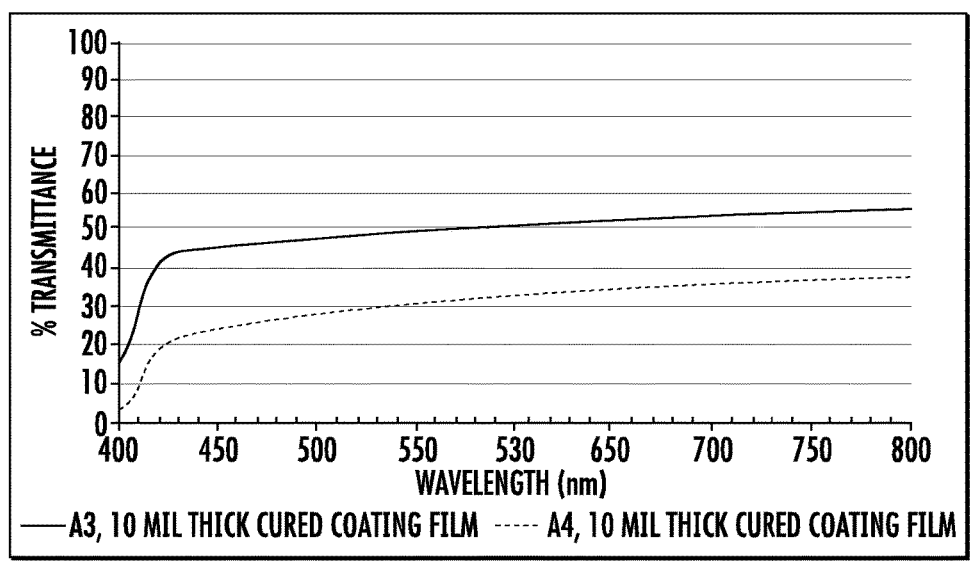
FIG. 8 is a graph depicting the transparency of LSFR coatings made according to exemplary embodiments.

Finally, optical fiber ribbons are often provided with optical fibers arranged in a color coded pattern so as to facilitate splicing, installation, etc. For example, a 12-fiber ribbon has a ribbon series color code with optical fibers sheathed in the following color series: blue, orange, green, brown, slate, white, red, black, yellow, purple, rose, and aqua. In order to take advantage of this identification feature, the LSFR coating needs to be somewhat transparent. In an embodiment, "optically transparent" means that a film of coating 10 mil thick transmits at least 75% of light between the wavelengths 400-800 nm (i.e., substantially the entire visible spectrum of light). Thus, the optical transparency was measured by casting and curing 10 mil thick films of coatings A3 and A4 under the ultraviolet cure conditions of at least 0.5 J/cm$^2$ of medium pressure mercury lamps with output between 200-400 nm. The cured films were then subjected to light at 400-800 nm, and the percentage of light transmitted through each film was measured. However, as shown in FIG. 7, 10 mil thick samples of the LSFR coatings A3 and A4 have an optical transparency of less than 75% for wavelengths 400-800 nm. Nevertheless, the LSFR coatings can be applied in a relatively thin layer (i.e., less than 40 microns) on the optical fiber ribbons such that the ribbon polarity identification can still clearly be discerned. In some embodiments, the LSFR coating 38 is applied to the optical fiber ribbon 16 in a layer having a thickness of 20 microns or less.

Figure 9:
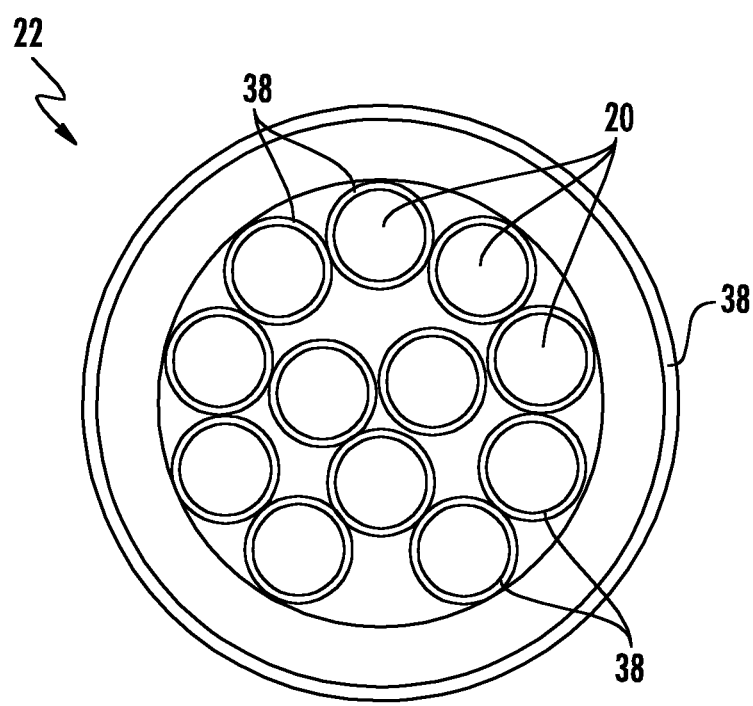
FIG. 9 depicts a buffer tube of a loose tube optical fiber cable having an LSFR coating applied to the buffer tube and optical fibers, according to an exemplary embodiment.

While the foregoing discussion focused primarily on optical fiber ribbon cables as a means of proving an exemplary embodiment for the purposes of discussion, the LSFR coating 38 can also be applied to other optical fiber cables in which the optical fibers are not arranged in ribbons. For example, in embodiments, the LSFR coating 38 is applied to various components of a loose-tube optical fiber cable. In embodiments, the loose-tube optical fiber cable includes a cable body, such as a cable jacket, having an inner surface that defines a central bore. Pluralities of optical fibers are located within the central bore. The optical fibers are arranged in groups of, e.g., 4 to 24 optical fibers, within buffer tubes. An exemplary buffer tube 22 is depicted in FIG. 9. As can be seen there, twelve optical fibers 20 are contained in the buffer tube 22. In the embodiment depicted, the LSFR coating 38 is applied to each of the optical fibers 20 and to the exterior of the buffer tube 22. However, in other embodiments, the LSFR coating 38 is applied to less than all of the optical fibers 20. In still other embodiments, the LSFR coating 38 is only to the exterior of the buffer tube 22, and in yet another embodiment, the LSFR coating 38 is applied to the interior of the buffer tube 22. By surrounding the cable components with the LSFR coating 38, the ability of fire to spread along a cable is reduced, and the amount of smoke produced by a cable during fire exposure is reduced.

Accordingly, embodiments of the LSFR coatings disclosed herein provide enhanced flame retardance capabilities while at the same time providing the requisite mechanical and physical properties necessary to manufacture, install, and utilize optical fiber cables containing the disclosed LSFR coatings. Specifically, as demonstrated above, the LSFR coatings have an elongation at break of greater than 10%, which indicates that these LSFR coatings are unlikely to experience cracking under abrasions typical of the mechanical processing of optical fiber ribbons. Surprisingly, while most flame retardant fillers are inorganic solids and not compatible with the organic coating materials, the LSFR coatings disclosed herein do not experience the same component segregation, which can lead to poor mechanical performance, that other conventional coatings can, in some circumstances, experience as a result of typical mixing and blending methods. By using very fine (e.g., 0.1 to 5 micron diameter) fillers that are dispersed within the coating medium, segregation of the coating components is mitigated.

The dispersion of the inorganic flame retardant filler in the curable medium has the added benefit of reducing the leaching of the flame retardant filler from the coating when the optical fiber cable is exposed to water soak conditions. Many flame retardant fillers are hydrophilic or water soluble, and thus, the fillers can be leached from the coating. This can have an adverse impact on any superabsorbent polymers included in the cable (e.g., in powdered form or as water blocking tapes and/or yarns). The LSFR coatings produced in accordance with embodiments disclosed herein experience 99.7% less leaching than other conventional coatings that, in some circumstances, are susceptible to leaching in water soak conditions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber ribbon cable, comprising:
  a cable jacket having an interior surface defining a central bore;
  at least one buffer tube located in the central bore of the cable jacket;
  at least one optical fiber ribbon disposed within the at least one buffer tube, the at least one optical fiber ribbon comprising:
    a plurality of optical fibers;
    a polymer matrix surrounding the plurality of optical fibers; and
    a low-smoke, flame retardant (LSFR) coating surrounding the polymer matrix;
    wherein the LSFR coating includes from 25 to 65% by weight of an inorganic, halogen-free flame retardant filler dispersed in a curable acrylate medium; and
    wherein the inorganic, halogen-free flame retardant filler is comprised of particles that have, on average, a maximum outer dimension of 5 microns.

2. The optical fiber ribbon cable of claim 1, wherein the polymer matrix does not delaminate from or break between the plurality of optical fibers when a twelve inch length of the at least one optical fiber ribbon is twisted about its longitudinal axis for at least 6 turns.

3. The optical fiber ribbon cable of claim 1, wherein the LSFR coating has a thickness of less than 40 microns.

4. The optical fiber ribbon cable of claim 1, wherein the LSFR coating is optically transparent such that a sample of the LSFR coating having a thickness of 10 mil transmits less than 75% of incident light having a wavelength of 400-800 nm through the thickness of the sample.

5. The optical fiber ribbon cable of claim 1, wherein the inorganic, halogen-free flame retardant filler is at least one of aluminum trihydroxide, magnesium hydroxide, zinc borate, huntite, aluminosilicate, organically modified phyllosilicates, ammonium octamolybdate, and hydromagnesite.

6. The optical fiber ribbon cable of claim 1, wherein the LSFR coating has a limiting oxygen index of at least 26%, measured according to ASTM D-2863.

7. The optical fiber ribbon cable of claim 1, wherein the LSFR coating has an elongation at break of at least 10%.

* * * * *